United States Patent [19]

Christopher et al.

[11] Patent Number: 5,689,301
[45] Date of Patent: Nov. 18, 1997

[54] METHOD AND APPARATUS FOR IDENTIFYING VIDEO FIELDS PRODUCED BY FILM SOURCES

[75] Inventors: Todd J. Christopher, Indianapolis, Ind.; Carlos Correa, Schwenningen, Germany

[73] Assignee: Thomson Consumer Electronics, Inc., Indianapolis, Ind.

[21] Appl. No.: 366,791

[22] Filed: Dec. 30, 1994

[51] Int. Cl.$^6$ .................................................. H04N 7/18
[52] U.S. Cl. ................................. 348/97; 348/97; 348/98; 348/451; 348/452
[58] Field of Search .......................... 348/97, 452, 451, 348/701, 416, 700, 98

[56] References Cited

U.S. PATENT DOCUMENTS

| | | | |
|---|---|---|---|
| 4,876,596 | 10/1989 | Faroudja | 358/140 |
| 4,933,759 | 6/1990 | Van der Meer et al. | 348/452 |
| 4,982,280 | 1/1991 | Lyon et al. | 358/105 |
| 5,084,755 | 1/1992 | Ozaki | 348/92 |
| 5,191,427 | 3/1993 | Richards et al. | 348/452 |
| 5,267,035 | 11/1993 | Weckenbrock et al. | 348/97 |
| 5,291,280 | 3/1994 | Faroudja et al. | 348/97 |
| 5,317,398 | 5/1994 | Casavant et al. | 348/97 |
| 5,365,273 | 11/1994 | Corea et al. | 348/452 |
| 5,444,493 | 8/1995 | Boie | 348/448 |
| 5,452,011 | 9/1995 | Martin et al. | 348/526 |
| 5,475,438 | 12/1995 | Bretl | 348/452 |
| 5,563,651 | 10/1996 | Christopher et al. | 348/97 |

OTHER PUBLICATIONS

For the examiner's information, Carlos Correa, a joint inventor of the present application, is also a joint inventor with Rainier Schweer of allowed US application Serial No. 08/052,048 filed Apr. 23, 1993. The Correa et al. application is directed to film mode detection and has been classified in class 348 sub-class 452.

*Primary Examiner*—Tommy P. Chin
*Assistant Examiner*—Anand S. Rao
*Attorney, Agent, or Firm*—Joseph S. Tripoli; Peter M. Emanuel; Robert D. Shedd

[57] ABSTRACT

A first pixel of a given field is compared with second and third vertically aligned pixels of corresponding horizontal position of an adjacent field to produce, for each first pixel, a pixel difference signal having a value of zero if the value of the first pixel is intermediate the values of the second and third pixels, the difference signal otherwise having a value equal to the absolute value of a difference between the value of the first pixel and the value of one of the second and third pixels having a value closest to that of first pixel. The pixel difference signals are accumulated over a predetermined portion of one field period of the video signal to provide a field difference signal which is analyzed by a group of five correlators for patterns characteristic of 2-2 pull-down or 3-2 pull-down film mode sources. Flags are produced for identifying film mode operation and for identifying which of the adjacent fields to use in subsequent video processing such as de-interlacing or flicker reduction.

8 Claims, 8 Drawing Sheets

600 ROM DATA

| CORRELATOR NO. | | 1 | | 2 | | 3 | | 4 | | 5 | |
|---|---|---|---|---|---|---|---|---|---|---|---|
| REFERENCE SIGN/MAG. BIT | | RS | RM | RS | RM | RS | RM | RS | RM | RS | RM |
| "C" 50/60 HZ | ADR | | | | | | | | | | |
| 0 | 000 | 0 | 1 | 1 | 1 | 0 | 0 | 0 | 0 | 0 | 0 |
| 0 | 001 | 1 | 1 | 0 | 1 | 0 | 0 | 0 | 0 | 0 | 0 |
| 1 | 000 | 0 | 1 | 1 | 1 | 0 | 1 | 1 | 1 | 1 | 0 |
| 1 | 001 | 1 | 1 | 0 | 1 | 1 | 1 | 1 | 0 | 0 | 1 |
| 1 | 010 | 0 | 1 | 1 | 1 | 1 | 0 | 0 | 1 | 1 | 1 |
| 1 | 011 | 1 | 1 | 1 | 0 | 0 | 1 | 1 | 1 | 0 | 1 |
| 1 | 100 | 1 | 0 | 0 | 1 | 1 | 1 | 0 | 1 | 1 | 1 |

FIG. 6

COMPARISON UNIT 300A

METHOD AND APPARATUS FOR IDENTIFYING VIDEO FIELDS PRODUCED BY FILM SOURCES

FIELD OF THE INVENTION

This invention relates of video signal processing and particularly to methods and apparatus for identifying whether a video signal originated by means of a film source or a video camera source.

BACKGROUND OF INVENTION

When receiving video information that was originally produced on film, there is an opportunity for performing essentially error-free de-interlacing of the signal. This is because each frame of the film source is used in generating at least two video fields, representing both types (odd/even) of interlaced fields. Therefore, if a video signal can be reliably determined to have originated on film, and the video fields corresponding to a common film frame can be identified, an essentially error-free non-interlaced video frame corresponding to a single instant in time can be generated by merging two of these fields. Other uses of film source identification include identification of redundant fields (which occur in 3-2 pull-down sources) to be deleted in digital transmission systems for improving channel coding efficiency.

Unfortunately, no special information is included in broadcast video signals to indicate which fields may have originated on film and which fields may have originated in a video camera, so the presence of film-based material must be inferred by examining differences between the luminance information of fields. This, however, can present a number of problems. For example, a strong similarity between successive video fields could indicate that they were generated from the same film frame; it could also be due to a lack of movement in the program material. Likewise, a difference between fields may indicate that the fields did not come from the same frame of information, but the difference could also be due to vertical spatial detail or transmission noise.

SUMMARY OF THE INVENTION

A practical film detector must distinguish between the foregoing situations by appropriately processing the field difference information and then examining a sequence of field differences, looking for distinctive patterns that are characteristic of known film sequences. In addition to distinguishing between motion/no-motion, noise, spatial detail etc. this problem is further complicated by the fact that there are two patterns generally encountered in video material derived from film sources. These include what is commonly known as "2-2 pull down" and "3-2 pull down".

In the 2-2 pull down system, each film frame generates two video fields, one of each type (odd/even). This is the only pattern common in 50 Hz (field rate) material, where it corresponds to 25 frames/second film. Occasionally this pattern may be found in 60 Hz video programming which was produced using 30 frame/second film.

In the 3-2 pull down process, one film frame is used to produce three video fields, and the next film frame produces two fields, in a repeating 3-2 pattern. This is the most common film format in 60 Hz (i.e., 60 field/second) video material corresponding to 24 flame/second film material.

The present invention is directed to meeting the need for a film mode detector which may be used with source material of various pull down patterns and in which ambiguities (due to factors such as scene motion (or its absence), vertical spatial detail, transmission noise or the like) are resolved to provide highly reliable identification of film originated video material.

A method of film mode identification, in accordance with the invention, comprises concurrently providing a first pixel from a given field and second and third vertically aligned pixels of the same horizontal position from a temporally adjacent field. The values of the pixels are compared to produce for each first pixel, a pixel difference signal having a value of zero if the value of said first pixel is intermediate the values of said second and third pixels, said difference signal otherwise having a value equal to the absolute value of the difference between the value of said first pixel and the value of one of said second and third pixels having a value closest to that of first pixel. Non-zero values of the pixel difference signals are accumulated over a predetermined portion of one field period of said video signal to provide a field difference signal. The accumulated values are then analyzed for a pattern indicative of a film source of said video signal.

Apparatus embodying the invention includes a first circuit for concurrently providing a first pixel from a given field and second and third vertically aligned pixels of the same horizontal position from a temporally adjacent field. A comparison circuit compares values of said selected pixels to produce for each first pixel, a pixel difference signal having a value of zero if the value of said first pixel is intermediate the values of said second and third pixels, said pixel difference signal otherwise having a value equal to the absolute value of the difference between the value of said first pixel and the value of one of said second and third pixels having a value closest to that of first pixel. An accumulator is provided for accumulating non-zero values of said pixel difference signals over a predetermined portion of one field period of said video signal to provide a field difference signal. A pattern analyzer, responsive to the field difference signal, analyzes the accumulated field difference signals for a pattern indicative of fields characteristic of a given film source pull-down sequence of said video signal.

BRIEF DESCRIPTION OF THE DRAWING

The invention is illustrated in the accompanying drawing, wherein like elements are denoted by like reference designators, and in which:

FIG. 6 is a memory map suitable for use in a ROM portion of the correlation units of FIG. 5;

DETAILED DESCRIPTION

Film mode video field identification in accordance with the present invention is of general utility. It may be used, illustratively, for identification of redundant fields in data compression transmission systems for identifying redundant fields to be dropped or deleted from the data stream. It may also be used to identify video fields derived from a common film frame to facilitate essentially error free de-interlacing of a video signal (i.e., progressive scan conversion of interlaced video signals). It may also be used for identifying the five fields common to a film frame for purposes of field rate doubling in the flicker reduction processing of video signals.

Figure 1:
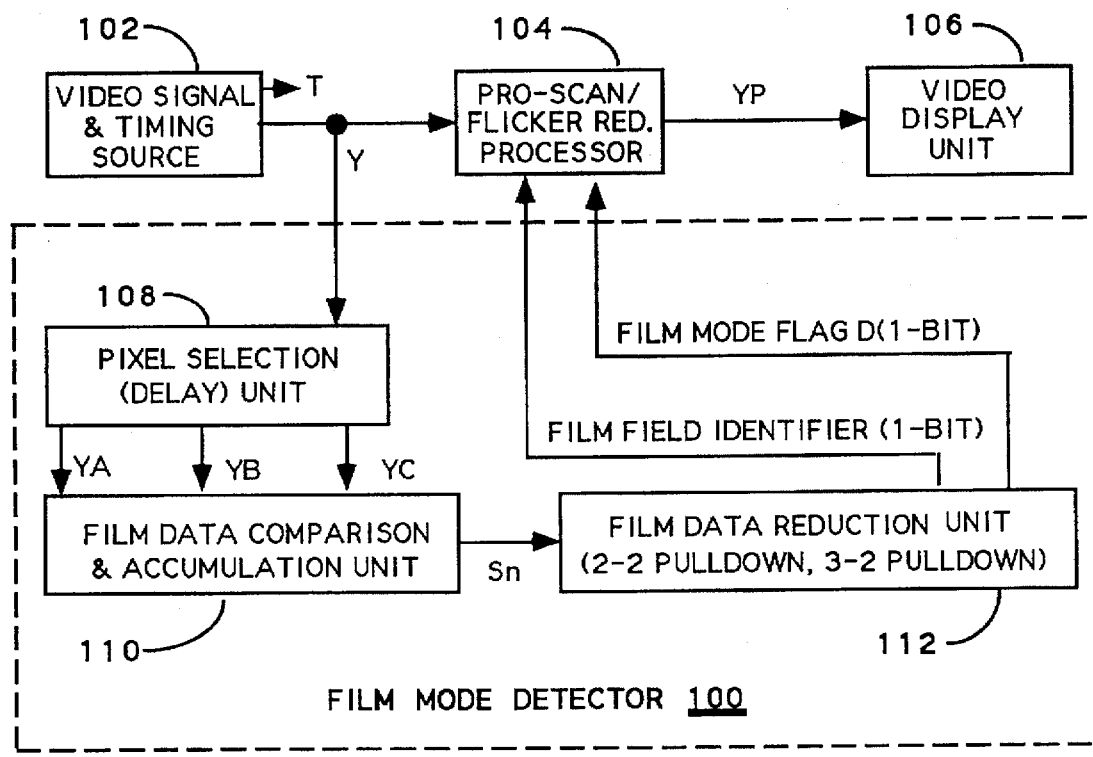
FIG. 1 is a block diagram of a television receiver including film mode identification apparatus embodying the invention.

The television receiver of FIG. 1 illustrates two of the foregoing uses, namely, for facilitating de-interlacing or flicker reduction in displayed images. The receiver comprises a video signal and timing signal source 102 which provides an interlaced luminance output signal Y and a group of timing signals (e.g., horizontal, vertical, pixel, etc.) indicated generally by the letter T. The video signal Y will be assumed to be originated by mixed film and camera sources and to be interlaced. Since all field selection decisions are based on processing of the luminance signal, and to simplify the drawing, chrominance processing is not shown. One of skill will recognize that when a particular luma field is identified and selected for display that the corresponding chroma field should also be selected.

The output of source 102 is applied to a video display trait 106 via a progressive scan/flicker reduction processor 104. This unit may be of conventional design for providing picture improvements such as deinterlacing or flicker reduction (or both) utilizing field the source identifications information provided by the identification apparatus 100 which embodies the invention.

Film mode detection apparatus 100, embodying the invention, comprises three principal elements, namely a video signal selection unit identified in the drawing as unit 108, a film data accumulation (or comparison) unit 110 and a film data reduction unit 112.

The input of unit 108 is coupled to receive the interlaced luminance signal Y provided by the source 102 and which comprises interlaced fields at a standard field rate (e.g., 50 Hz for PAL or SECAM or about 60 Hz for NTSC). From the input video signal Y, unit 108 concurrently selects three output video signals. These signals comprise pixels that are concurrently produced by source 108 and in which pixels YC are delayed by a field less half a line relative to pixels YA and pixels YB are delayed by one field plus a half line relative to pixels YA.

Figure 2:
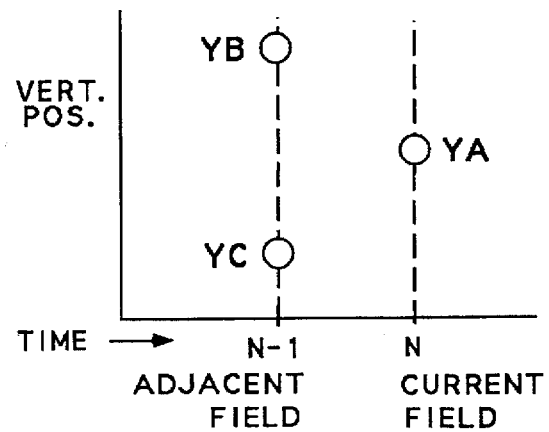
FIG. 2 is a vertical/temporal diagram useful in explaining the invention.

The spatio-temporal arrangement of pixels YA, YB and YC is shown in FIG. 2 where it is seen that each first pixel (e.g., YA) from a given field (e.g., the current field N)is concurrently produced with second and third pixels (e.g., YB and YC, respectively) having the same horizontal position of the temporally adjacent field (e.g., the adjacent field N−1) To restate the timing of this trilogy of pixels, one field less a half line corresponds to a delay of 262 lines in 60 Hz (i.e., field per second) television standards (NTSC) or 312 lines in 50 Hz systems (e.g., PAL or SECAM). One field plus a half line corresponds to 263 lines in 60 Hz systems or 313 lines in 50 field per second systems.

Figure 11:
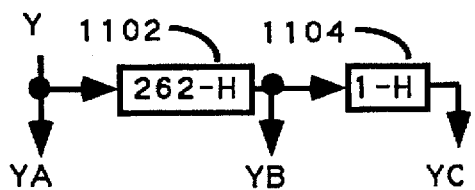
FIGS. 11, 12 and 13 are block diagrams of suitable implementations of a pixel selector unit of FIG. 1.
Figure 12:
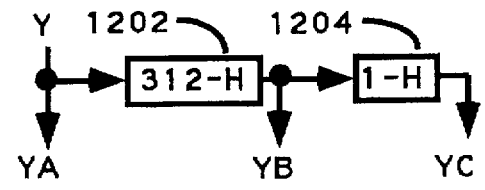
Figure 13:
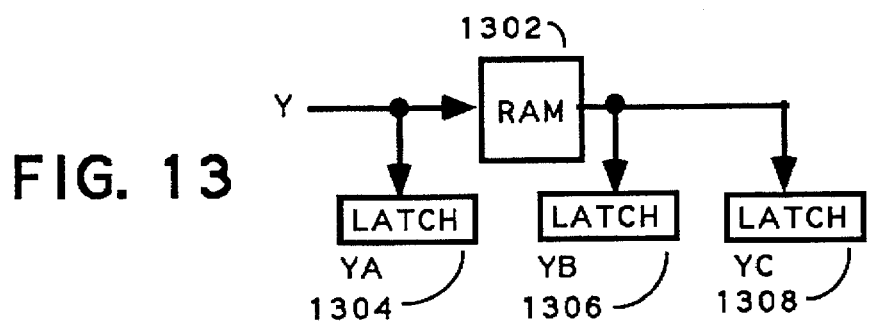

FIGS. 11, 12 and 13 illustrate suitable implementations of unit 108. In FIG. 11 video signal Y is applied directly as an output as YA, delayed by 262 lines in delay unit 1102 to form YB and by an additional line in line delay unit 1104 to form YC. This implementation is suitable for NTSC 60 field per second systems. For 50 field per second systems the delay is changed to 312 lines for unit 1202 as shown in FIG. 12. Alternatively as shown in FIG. 13, the delayed signals may be provided by storing the input signal Y in a RAM 1302 having plural output latches 1304, 1306 and 1308 providing YA, YB and YC, respectively.

Film data comparison and accumulation unit 110 provides, as a first function, a comparison of the values of the selected pixels (YA, YB and YC) on a pixel by pixel basis to produce for each first pixel (YA), a pixel difference signal having a value of zero if the value of the first pixel (YA) is intermediate the values of the second (YB) and third (YC) pixels, the difference signal otherwise having a value equal to the absolute value of the difference between the value of the first pixel (YA) and the value of one of the second and third pixels (either YB or YC) having a value closest to that of the first pixel (YA). FIGS. 7–10, discussed later, illustrate this unique form of pixel difference generation for the specific embodiments of unit 110 shown.

A second function provided by unit 110 comprises accumulating non-zero values of the pixel difference signals over a predetermined portion (e.g., the active lines) of one field of the video signal to provide a field difference signal. The film data reduction unit 112 receives the field difference signal Sn provided by unit 110 and analyzes the accumulated field difference signals field by field for a pattern indicative of a film source which may be operating, for example, in a 2-2 pull-down mode or in a 3-2 pull down mode. As a result of this analysis two signals are produced for controlling the processor 104. One of these signals is a flag identifying film mode and the other is an identifier pointing out which field was from a film source.

In brief summary, unit 110 functions as a "film mode detector" which calculates pixel-by-pixel differences between the present field and the preceding field, using luminance information from the present field and the adjacent lines of the previous field as described above. The differences are processed to minimize the effects of spatial information and accumulated over the active portion of the active lines of the field. This produces, in the embodiment which follows, an 8 bit field difference status signal Sn which is a measure of how much the present field differs from the previous field. The film data reduction unit 112 uses signal Sn values to provide a "field flag output signal which indicates (during the next field) which adjacent field came from the same film frame, a "sign" signal which indicates whether (1) the material originated from film and (2) to identify the position of the field in the film sequence. This section contains several correlators operating in parallel that compare stored references sequences (representing candidate film sequences) with the pattern of the Sn field difference data. When one of the correlators indicates that film material is being processed, the Film Mode status signal (FM, one bit) is activated. Further, a film field identification status signal FF is produced which identifies which adjacent field will be used by the Y interpolation circuits of the processor 104.

With the foregoing description in mind, attention will now be given to more detailed examples of the invention.

Discussion of Comparison and Accumulation Unit 110

Figure 3:
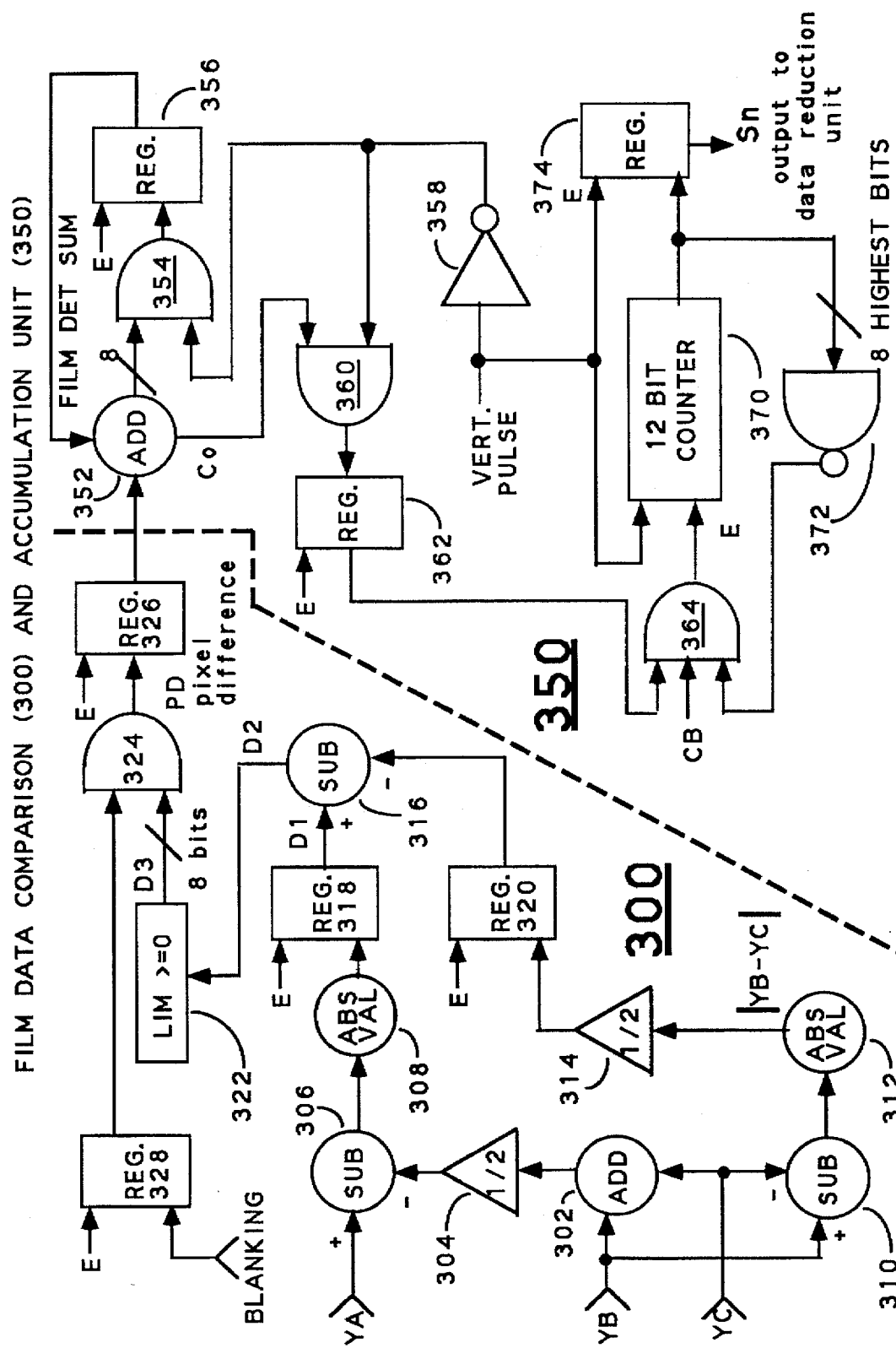
FIG. 3 is a detailed block diagram of a film data accumulation apparatus suitable for use in the identification apparatus of FIG. 1.

To simplify description of Unit 110, a diagonal dashed line has been drawn through FIG. 3 separating the block diagram into a film data comparison unit 300 and a film data accumulation unit 350.

The overall function of unit 110 is to accumulate data representative of field differences, producing a single result Sn, an eight bit number in this example, at the end of each field. This 8-bit number, as will be explained, corresponds to the 8 highest bits of a 20 bit accumulation for each field. To reduce the effect of vertical spatial information, the accumulated sum remains unchanged if the present field luminance level lies between the luminance levels of the pixels immediately above and below in the previous field. Otherwise, the absolute difference between the luminance level of the present pixel and the preceding field vertically adjacent pixel having the closest luminance value is accumulated. At the end of each field, the accumulated sum is latched and the accumulator is cleared.

The foregoing is accomplished as follows. In the comparison unit 300, an adder 302 and a divide by two unit 304 calculates the average of pixels YB and YC, from the adjacent lines of the previous field N–1 (see FIG. 2). The absolute value of the difference between this average and the present field luminance pixel value YA is determined by a subtractor 306 and an absolute value circuit 308 thus producing an initial field difference value D1. Concurrently, one-half of the absolute difference between the previous field adjacent pixels, provided by subtractor 310, absolute value circuit 312 and attenuator 314, is then subtracted in subtractor 316 from D1. This subtraction produces a negative result whenever YA is intermediate between the values of YB and YC. To compensate for the different signal processing delays leading to subtractor 316, the signals applied thereto are re-timed by respective ones of a pair of pixel docked retiming latches 318 and 320 respectively.

The output difference signal D2 (8 bits) of subtractor 316 is then limited by limiter 322 to remove negative values, and the resultant signal D3 is gated by AND gate 324 responsive to a blanking signal (from signal T of source 102) which is retimed by pixel rate latch 328. This gating confines the pixel difference signal to the active portions of a video field producing thus eliminating the effects of synchronizing signals and other signals which may be present in the vertical blanking interval on the final pixel difference signal PD produced by AND gate 324. A further register 326 provides retiming of the signal PD in synchronization with the pixel rate to compensate for gate delays as do registers 318, 320 and 328 as previously described.

Figure 7:
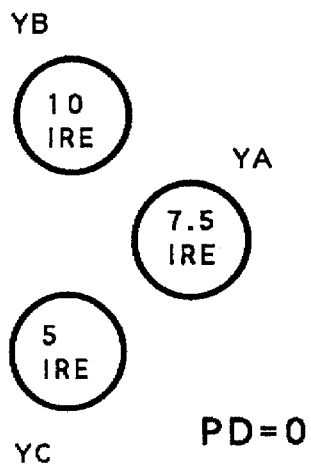
FIGS. 7–10 are spatio-temporal pixel diagrams illustration operation of the data accumulation apparatus of FIG. 3.

FIGS. 7–10 give specific examples of the processed pixel difference signals PD provided by the comparison unit 300 of FIG. 3. In FIG. 7 a case is shown wherein the value of YA is between the values of YB and YC of the previous field. Since unit 300 assigns a difference of zero to all cases where YA is intermediate YB and YC, the pixel difference value PD equals zero (PD=0) and forms no part of the ultimately processed signal.

Figure 8:
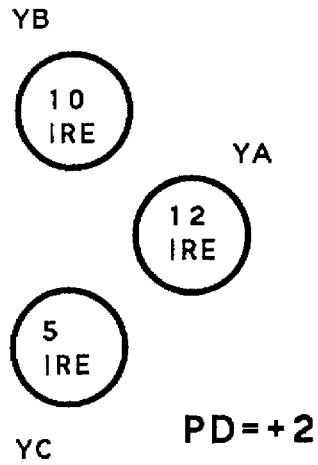

FIG. 8 shows a case wherein YA is above YB and YC. Specifically YA is 2 IRE greater than YB and is 7 IRE above YC. Since the unit 300 selects a difference value equal to the absolute value of the difference between the value of the first pixel YA and the value of the one of the second and third pixels YB and YC closest to the value of the first pixel YA, the difference selected for PD is +2 IRE and the 7 IRE difference is ignored.

It is an important feature of the present invention that in the above and following examples of determination of the pixel difference values in unit 300, that the method always produces a minimum result for a change. In other words, of the two differences between YA and the pixels YB and YC, only the smallest difference is used. The advantage of this is that it minimizes the potential distortions of very large vertical differences between YB and YC which tends to prevent one pixel difference measurement from unduly weighting the final accumulated field data sum. In other words, very large changes (due to vertical detail, motion, abrupt horizontal edges, noise, etc.) are reduced to a minimum difference so that the accumulated field total is not skewed or unduly influenced by a few abrupt brightness changes.

Figure 9:
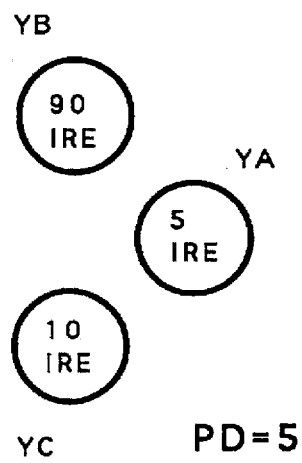
Figure 10:
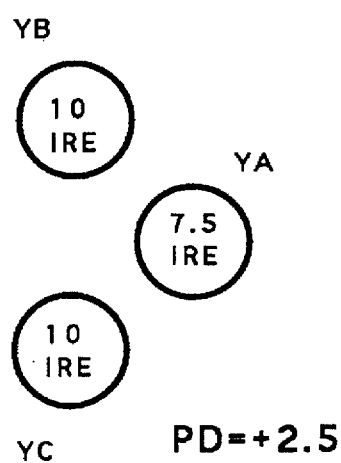

As an example of the advantage of selecting differences based on the closest of YB and YC to the value of YA, values are selected in FIG. 9 wherein in field N–1 there is a 80 IRE transition between pixel YB (90 IRE) and pixel YC (10 IRE). Since, in accordance with the invention, the pixel difference PD is always based on the closest of YB and YC to YA, the resultant pixel difference for this large change in field n–1 for a value of YA of 5 IRE, is equal to only 5 IRE for the 80 IRE change in field n–1. Note that a much larger result would occur if pixel YA were to be compared with YB or with some form of average of YB and YC. Accordingly, the generation of pixel differences PD in unit 300 avoids unduly weighting the results of the ultimate field difference signal that is generated. As a further example of generation of signal PD, in FIG. 10 the values of YC and YB are equal (10 IRE) and the value of YA is 7.5 IRE yielding a difference of +2.5 IRE.

Figure 16:
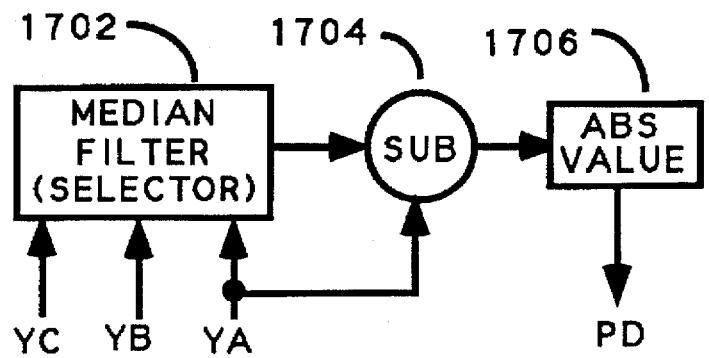
FIGS. 16 and 17 are block diagrams illustrating certain modifications of apparatus of FIG. 1.

At this point it is instructive to note that a different physical structure or circuit arrangement may be used for implementing the comparison unit 300 to form the pixel difference signal PD from the pixels YA, YB and YC. Such an alternative structure is illustrated comparison unit 300A in FIG. 16. There the pixel difference signal PD is produced by applying YA, YB and YC to a median value selector 1602, subtracting YA from the median result in subtractor 1604 and taking, in unit 1606, the absolute value of the difference provided by the subtractor 1604 to produce signal PD.

Figure 17:
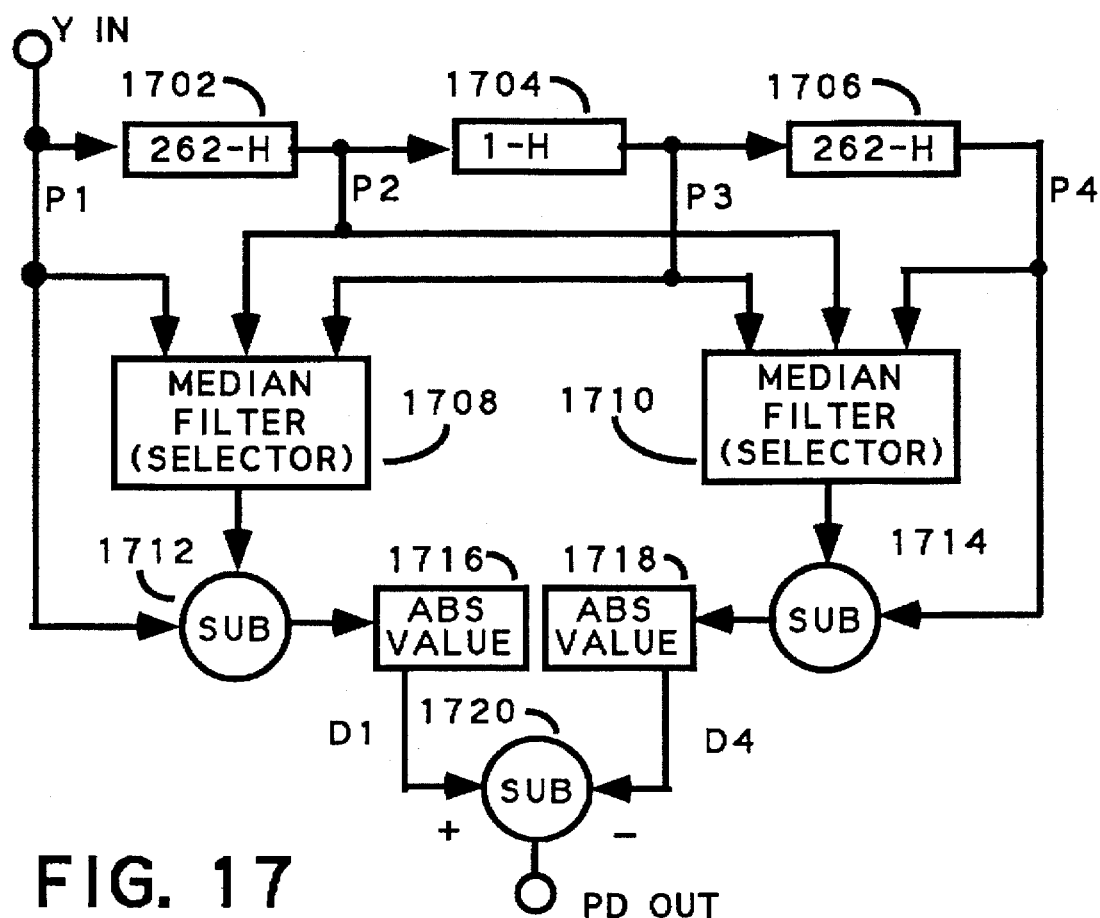

The embodiment of comparison unit 300 in FIG. 3 is presently preferred over that of FIG. 17 for the pixel difference generation for reasons of circuit economy since unit 300 does not require median value selection. Other circuit arrangements may be employed, if desired, as long as they produce a similar result of yielding zero for cases where YA is intermediate YB and YC and yielding otherwise the absolute value of the difference between the value of the first pixel YA and the value of the one of the second and third pixels having a value closest to that of the first pixel.

As noted above, the pixel difference signal produced for each pixel is an 8-bit number. The accumulation of this 8-bit number over all active pixels of a field could produce a result more than 25 bits wide. In accordance with a feature of the accumulator 350 of FIG. 3, such complexity is avoided by a combination of an accumulator and a counter of less than 25 bits total with an overflow inhibit of counter.

In more detail, the output signal PD of comparison unit 300 is applied to an 8 bit accumulator comprising an 8-bit adder 352, and AND gate 354 and an 8-bit register 356. Adder 352 adds the 8 bit signal PD to the previous sum stored in the 8 bit latch 356 thereby adding PD to the latch output for each pixel difference value measured in a field. The AND gate 354 couples the sum of adder to the latch to facilitate clearing of the accumulator once each field in response to a vertical pulse (from timing signal T) which is inverted by inverter 358. During a field, a carry out pulse Co is produced by adder 352 in the accumulator every time the accumulated pixel difference PD exceeds 8 bits (i.e., a count of 255).

The carry out pulses Co provided by the 8-bit accumulator (352–356) are applied via an AND gate 360, a retiming register 362 and a further AND gate 364 to a 12 bit counter 370. Gate 360 provides the function of inhibiting Co during the vertical pulse period. Register 362 retimes the carry-out signal Co with the pixel clock (E). Gate 364 clocks the input of counter 370 in the absence of blanking pulses CB and an overflow inhibit signal applied to its other two inputs. With regard to overflow prevention, recall that the pixel difference signal is capable of producing an accumulated result of more than 25 bits wide in a field interval. The maximum accumulated count, however, is 20 bits (i.e., the 8 bits of accumulation plus 12 bits of counting). Accordingly, to prevent overflow when a large difference between frames occurs (e.g., at a scene change), the counter 370 "saturates" or stops counting at a maximum count. More specifically, the overflow signal is produced by an 8 input AND gate which disables gate 364 and thus inhibits further counting by counter 370 when the 8 most significant bits (MSB) of counter 370 are high. A portion of the output of counter 370 (i.e., 8 MSB of the 12 bit count) is stored in an 8-bit register 374 at the end of each field in response to the vertical pulse and the counter is reset for accumulation of the pixel difference signals PD in the next field.

Discussion of Data Reduction Unit 112

Figure 4:
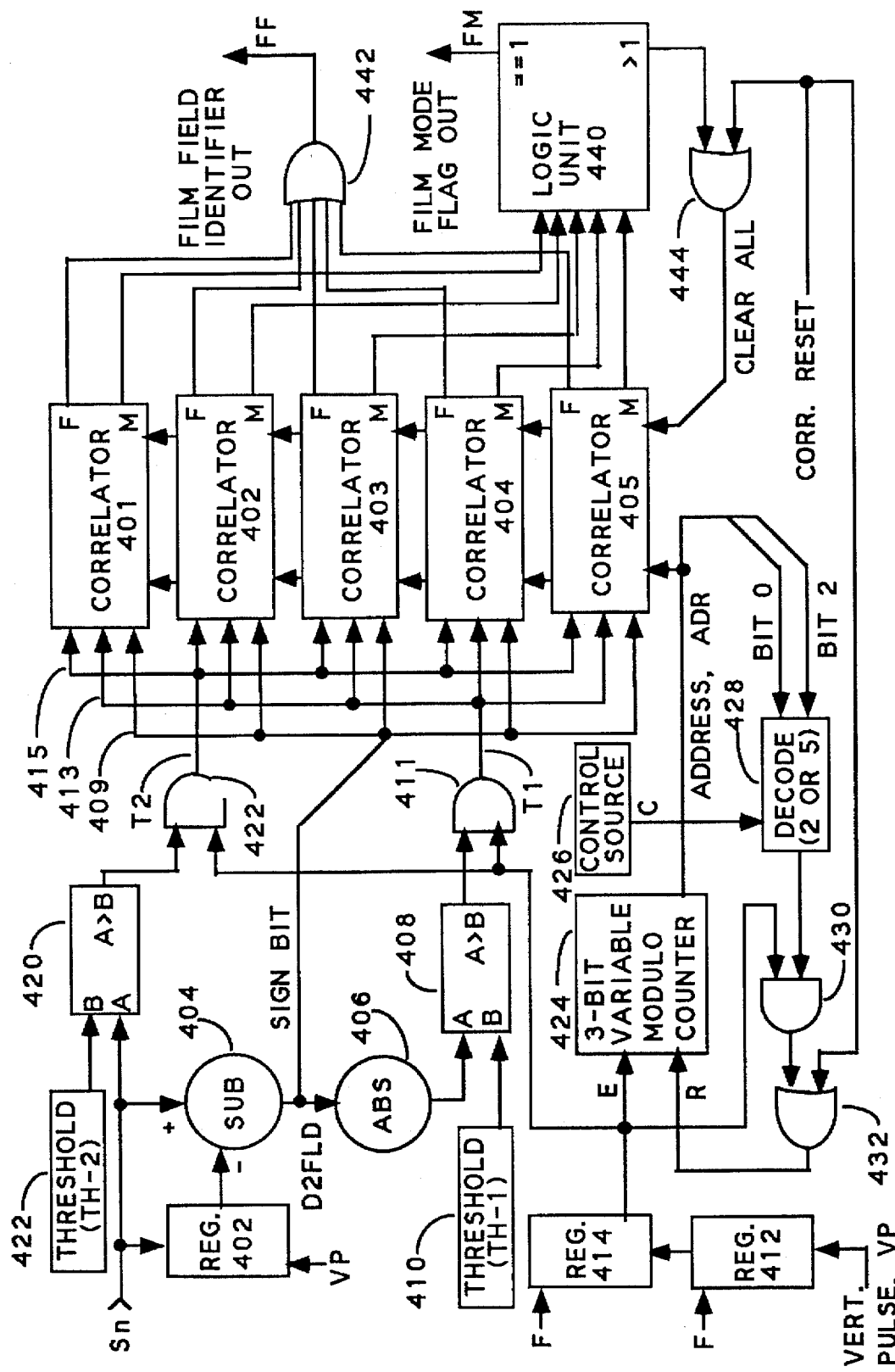
FIG. 4 is block diagram of film data reduction unit suitable for use in the identification apparatus of FIG. 1.

The data reduction unit 112 of FIG. 4 uses the field difference information Sn which arrives each field from accumulator 350 to identify the presence of a particular film sequence. One potential problem is that noise and vertical spatial detail increase the value of Sn, possibly masking the desired information. Fortunately, a distinguishing characteristic of film material is a pattern of small and large field differences which occurs as fields are successively generated from the same or different film frames. By determining the change in the Sn signal on each successive field, the changing pattern due to film is enhanced while offsets tend to cancel. In unit 112 this change in field difference is compared to expected film-generated patterns using correlation techniques.

When receiving 60 Hz material, possible 3-2 pull down patterns are compared using a bank of five correlators 401–405, each having a reference sequence stored in an internal ROM. With video signals containing 50 Hz film originated fields, 2-2 pull down patterns are compared, requiring the use of only two of the correlators; in which case the remaining three correlators are not used. When one of the correlators detects the presence of a particular film sequence, it signals this fact to the de-interlacing and 100 Hz (flicker reduction) processors 104 in FIG. 1 and additionally indicates which adjacent field was derived from the same film frame. Thus the end result of the correlation produces two signals, providing (1) the presence of film originated material and (2) the identity of which of the two adjacent fields to use for line-doubling or field rate doubling.

In more detail, in data reduction unit 112 of FIG. 4 an 8-bit latch 402 (enabled by the same vertical pulse used in accumulation unit 350) delays the field difference signal Sn by one field. This delayed signal is subtracted from the un-delayed field difference signal Sn in subtractor 404 to form a two's-compliment signed 9-bit signal D2FLD signal which indicates how much change there is between the field difference signal Sn of successive fields. The sign bit of D2FLD, labeled "sign bit" indicates whether Sn increased (zero) or decreased (one); it forms a one-bit per field sequence which is compared with candidate film sequences (2-2 pull down or 3-2 pull down) in the correlators 401–405.

Since useful information is available only when there is appreciable motion in the video signal, a determination is made whether sufficient change occurred to make the polarity data significant. In other words, the polarity data, taken alone, has been found to be insufficient to un-ambiguously and reliably determine the pull down patterns. It is for this reason that the field difference magnitude data derived from the pixel difference data is preserved.

More specifically, the absolute magnitude of the field to field difference signal D2FLD is produced in absolute value circuit 406 and compared in comparator 408 with a binary threshold signal TH-1 provided by source 410. For purposes of optimizing system performance, it is desirable that the source 410 be variable or programmable although a fixed or "hard-wired" source may be used if such flexibility in optimizing the overall system is not required in a particular application. If the magnitude of the D2FLD exceeds the "first" threshold TH-1 of source 410, the correlators 401–405 are enabled for material which may contain 3-2 pull-down film mode sequences, otherwise only correlators 401 and 402 need be enabled for processing film mode material containing 2-2 pull-down sequences. The signal TH-1 is gated in an AND gate 411 by the vertical pulse VP delayed by two clock periods (by registers 412 and 414) so that information from the latest field is used in the following correlation calculations. This threshold control signal T1 is distributed to each of the five correlators 401–405 via bus 413.

At this point it is instructive to note that the use of the D2FLD alone in sequence identification by the correlators 401–405 may not be absolutely reliable. For example, if film material is followed by very regular non-film (i.e., video camera generated) material, such as scrolling text on a stationary background, the field difference signal Sn may be large but nearly constant, producing little change from field to field. In this case the magnitude of D2FLD might not exceed the threshold TH-1, allowing the system to continue in the film mode operation. To detect this, and similar situations, the field difference signal Sn is compared in comparator 420 with another threshold TH-2 provided by another programmable source 422. As before, the source 422 may be of a fixed binary value but the programmability feature allows "fine tuning" or optimization of the overall system. The value of the threshold TH-2 is typically set to a much larger value that the other threshold TH-1. That is TH-2>>TH-1. This threshold relationship overcomes the problem, noted above, of scrolling test on a stationary background and other similar motion conditions. The result of the comparison in comparator 420 is then gated in AND gate 423 by the delayed vertical pulse VP provided by registers 412 and 414 to generate threshold signal T2 which will cause the appropriate correlation counters (in correlators 401–405) to be reset. Signal T2 is distributed to each of the five correlators via a bus 426.

The ROM addresses in each correlator are continuously advanced one position every field by the addressing signal ADDR which is common to all of the correlators. The correlator ROM address signal ADDR is generated by a 3-bit variable modulo counter 424 having synchronous enable (E) and reset (R) inputs. The counter is enabled or clocked once per field by the delayed vertical pulse provided by registers 412 and 414. When receiving 50 Hz (field per second) signals only 2-2 pull down film sequences (which repeat every other field) are identified by two of the five correlators. The counter 424 is then reset following a count of 1 addressing only two ROM locations. When receiving 60 Hz signals, 3-2 pull down sequences are identified which have a five field sequential pattern. In this case the counter 424 is reset following a count of 4 thereby addressing five ROM locations.

Variation of the modulo of counter 424 for controlling selection of 2-2 pull down and 3-2 pull down operating modes is controlled by means of a control source 426. This source may comprise, illustratively, a manually operated switch for providing a binary "one" output for one pull down mode and a binary "zero" output for another pull down mode. Alternatively, automatic system operation may be provided by selecting a field rate detector as control source 426 for providing a control signal C to thereby automatically select modulo 2 counting for 50 Hz field rate signals to enable two of the five correlators and to automatically select modulo 5 counting in counter 424 for enabling all five of the correlators when 60 Hz video signals are present. To facilitate the variable modulo counter of the three bit counter 424 the highest and lowest bits (2 and 0) are decoded in decoder 428 in response to the control signal C. When C indicates 50 Hz field rate, decoder 428 resets counter 424 on a count of 2 via AND gate 430 and OR gate 432 which couple the decoder output to the counter reset (R) input. When C indicates 60 operation, decoder 428 resets counter 424 on a count of 5 thus enabling correlation of five field sequences characteristic of 3-2 pull down video fields. The purpose of the AND gate 430 is to synchronize the decoder 428 output with the delayed vertical pulse VP. OR gate 432 is used to provide an alternative reset input to counter 424 of a signal denoted "correlator reset" which may be used, for example to initialize the overall system. Such a signal may be provided manually or it may be generated automatically, for example, from a so-called "power up" detector or some other suitable source of initialization signals.

Considering now the overall operation of the five correlators 401–405, each of these correlators has two outputs, F and M. The output F indicates which field in film mode operation should be selected for interpolation or field repeating in the processor 104. All of the F outputs are combined in an OR gate 442 to provide the film field or FF identifier output signal. The M output signifies when a correlator has detected a "match" to an expected pattern. A combinatorial logic block 440 detects if more than one correlator is producing a high M value; if so, it means that a correlation error has occurred and all correlators are immediately cleared by means of gate 444 which couples the "greater than 1" output of logic unit 440 to the clear all reset buss of the five correlators. If the logic block 440 detects that exactly one M is high, then the Film Mode Status Flag (FMSF) is activated. When flag FMSF is so activated, the Film Field identification signal FF indicates to the processor 104 which one of the adjacent fields should be used, for example, for interpolation: a zero indicates the field N containing YA pixels and a one indicates the adjacent field. As previously noted, a correlation reset control signal is used for resetting the variable modulo counter 424. This same signal is combined in OR gate 444 with the reset output of logic unit 440 for initializing the system (i.e., resetting counter 424 and clearing correlators 401–405.

Figure 5:
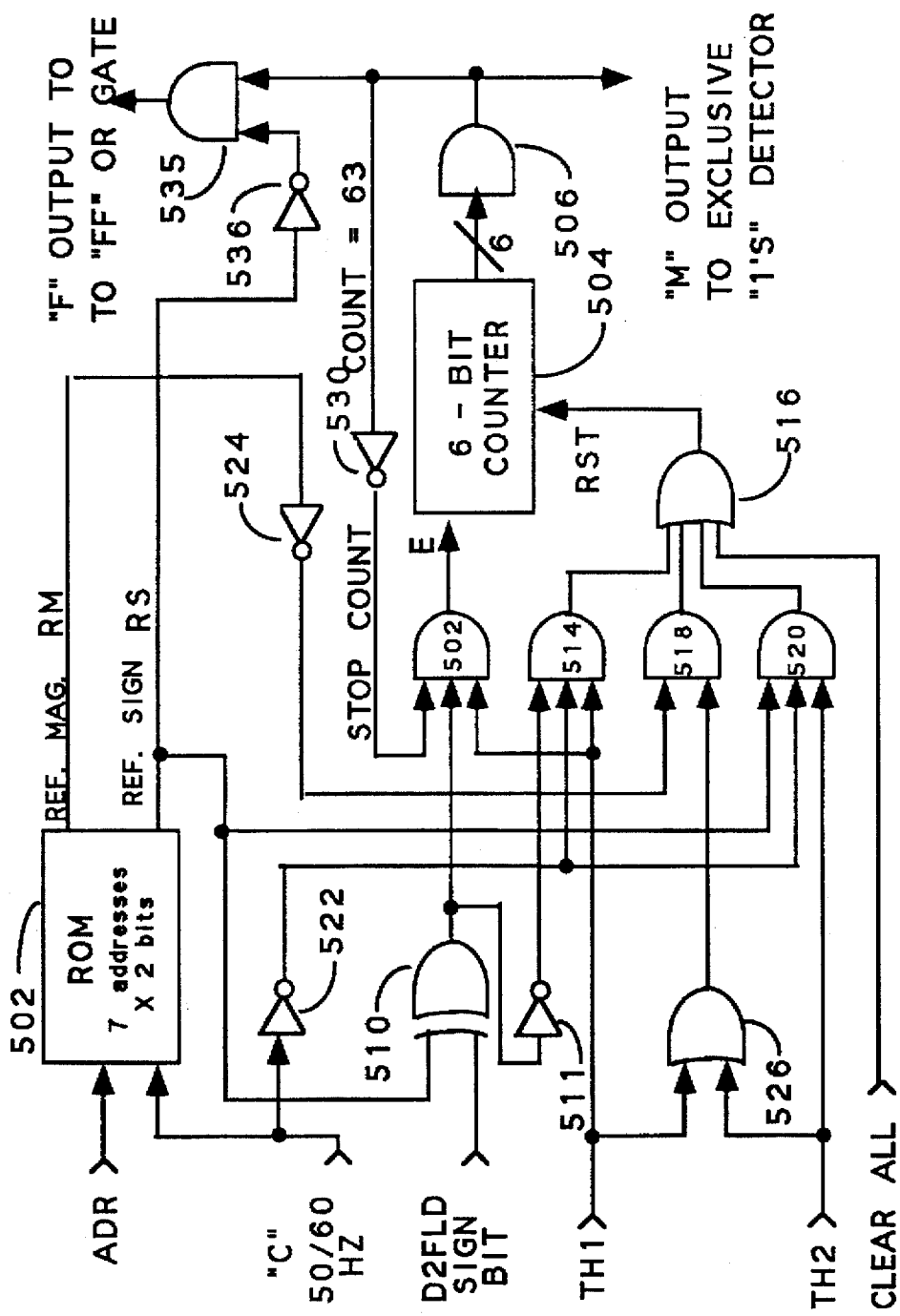
FIG. 5 is a detailed block diagram of a typical correlator suitable for use in the data reduction unit of FIG. 4.

FIG. 5 provides a detailed logic diagram of a typical one of the correlators 401–405. The correlators compare the D2FLD sign bit provided by subtractor 404 with a reference sign sequence RS stored in the correlator's ROM 502. When the sequences match and the TH-1 (first) threshold signal enables the correlator (e.g., via the threshold 1 bus 413), a 6-bit counter 504 is incremented. If a miss-match occurs, or other events indicate that the film sequence is not present (e.g., if more than one correlator indicates a match) the counter 504 is reset to zero. Otherwise, each sequence match increments counter 504 and when it reaches full scale (i.e., all "1's") this condition is detected by a 6-input AND 506 which provides the output signal M=1 indicating that a sequence match has been detected.

As shown in FIG. 6, the internal ROM 502 of each of the correlators 401–405 contains seven addresses. One bit of the address is provided by the 50/60 Hz field rate signal "C" produced by control source 426. Three additional bits are provided by the variable modulo counter 424. The first two of the address locations correspond to 2-2 pull down and are addressed when signal "C" is low (50 Hz operation) by counter 424 (ADR) values of 000 and 001. The other five addresses correspond to 3-2 Full down sequences and are addressed when "C" is high ("1") by counter 424 ADR values of 000 through 100 (i.e., 0–4 in decimal).

Two bits of information are stored at each address as shown in the ROM data table 600 of FIG. 6. One bit represents "reference sign" (RS). This represents the expected polarity of the field difference signal Sn. A logic zero indicates a positive polarity signifying that the last two fields are from different film flames. The other bit represents "reference magnitude" (RM). This bit is equal to logic zero when the expected magnitude of D2FLD is zero, logic one when expected to be non-zero. A zero expected magnitude actually occurs only on the one field in the 3-2 pull down sequence when the last 3 fields are from the same film frame.

The 6-bit counter 504 within each of the correlators has synchronous enable (E) and reset (RST) inputs. The reset input has priority over the enable input. Incrementing of the counter is controlled by exclusive OR gate 510 which compares the reference sign bit RS of ROM 502 with the D2FLD sign bit of subtractor 404. If the first threshold TH-1 is active and the counter is not at full scale and the exclusive OR gate indicates a match, an AND gate 512 is enabled thereby incrementing counter 504.

When operating on 50 field per second video signals, if the threshold TH-1 is active and the exclusive OR 510 detects a mismatch, the counter 504 is reset by inverter 511 and AND gate 514 which is coupled to the reset RST input via OR gate 516. The counter 504 is also reset (via AND gate 520) when operating on 50 Hz signals if the second threshold TH-2 is active (high) and the reference sign RS is negative (RS is inverted by inverter 522 at the input of AND gate 520). This condition indicates that the field difference should have been generated from a single film frame.

When 60 Hz signals are being processed, the counter 504 is reset (via inverter 524, OR gate 526 and AND gate 518) at any time the reference magnitude RM signal is low (indicating that the last three fields should have come from the same film frame) and either of the threshold signals TH-1 or TH-2 is active.

If the counter 504 reaches a full scale count of 63 (all 1's in binary) AND gate 506 is enabled indicating a sequence match thus setting the correlator's output to "1". This signal is also inverted by inverter 530 thus disabling AND gate 512 and stopping further counting. The field flag ("F") output (AND gate 535) is also enabled (via inverter 536 which inverts signal RS and AND gate 506 that provides the M output signal). Enabling of the field flag output "F" indicates (during the next field) which adjacent field came from the same film frame. For the sequences detected by this system, the field to be used can be obtained by inverting the "reference sign, RS" signal from the read only memory (ROM). If the "clear all" signal is high (indicating that more than one correlator has simultaneously found a match), the counter 504 is immediately reset via OR gate 506 on the next clock. When generating 50 Hz reference sequences (first two rows of ROM contents) the reference magnitude RM bit is set low for the last three correlators. This ensures that they never increment, while they are reset whenever threshold signal TH-1 or threshold signal TH-2 is present; the value of reference sign RS is arbitrary in these cases.

Figure 14:
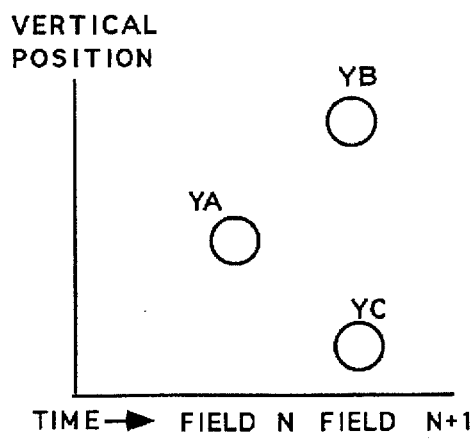
FIGS. 14 and 15 are spatio-temporal pixel diagrams illustrating modifications of the data accumulation apparatus of FIG. 3 in accordance with further embodiments of the invention.

Various changes may be made to the embodiments of the invention described thus far. For example, FIG. 14 illustrates a case where the pixel YA is taken from field N rather than N+1 and the pixels YB and YC are taken from the field N+1 rather than field N.

Discussion of Four-Pixel Processing

Figure 15:
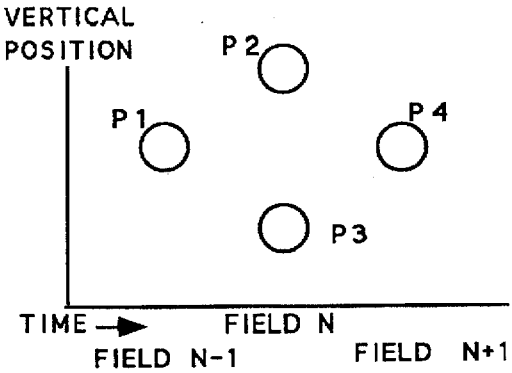

As another alternative, a further field may be used in comparator 300 to generate the pixel difference signal as shown in FIG. 15 wherein pixel P1 is taken from field N−1, Pixels P2 and P3 are taken from the adjacent field N and a fourth pixel P4 is taken from the next adjacent field N+1. This alternative, hereafter "four-pixel processing" may be implemented as shown in FIG. 17 wherein delays 1702, 1704 and 1706 provide the delays for pixels P2, P3 and P4 relative to P1. The median selector 1708 and subtractor 1712 function as in the example of FIG. 16 to produce the difference D1 from pixels P1, P2, and P3. Similarly, median selector 1710 and subtractor 1714 produce the pixel difference D4 from P2, P3 and P4. A resultant pixel difference signal FD is produced by subtracting D4 from D1. Extending the pixel difference calculation over two fields as shown advantageously reduces artifacts due to noise which tends to cancel in subtractor 1720 at the cost of one additional field of memory.

As a further alternative to the example of FIG. 17, the same value for D may be calculated for four-pixel processing in different hardware by use of the following relationship:

$$D=MAX[ABS(P1-P23avg); P23dif]-MAX[(ABS(P4-P23avg):P23\%dif]$$ wherein $P23avg=(P2+P3)/2$ and $P23dif=ABS(P2-P3)/2$ The above equation for "D" states that D is the difference between two maximum values (MAX). The first maximum value is taken is the larger of (i) the absolute (ABS) difference between P1 and the average of P2 and P3 and (ii) the difference between P2 and P3. The other maximum value is taken as the larger of (iii) the absolute difference between P4 and the average of P23 and (iv) the P23 difference. In terms of physical hardware, a suitable circuit may be constructed, by inspection of the equation, by means of two maximum value circuits, three absolute value circuits, some subtractors and some dividers connected so as to implement the indicated functions.

When the comparison unit is constructed, either as shown in FIG. 17 or as described in the alternative embodiment described above, D will have a value of zero if P1 and P4 are intermediate between P2 and P3. D will be positive if P1 is outside the values of P2 and P3 while P4 is intermediate. D will be negative if P1 is intermediate between P2 and P3 while P4 is outside this range. If both P1 and P4 are outside the range of values of P2 and P3;, the sign of D is determined by whether P1 or P4 are further from P2, P3. The advantage of using the four (4) pixel approach to generation of the pixel difference signal D is that one obtains a first-order cancellation of the effects of vertical spatial detail and channel noise. The cost, as previously noted is that a further field delay is required.

Continuing with the discussion of the alternative 4 pixel group processing of FIG. 17, the difference signal D is summed pixel-by-pixel over the field producing an accumulated sum, Sn' for field N. This sequence of Sn' is further processed in the data reduction unit 112 much the same as signal Sn in the previous example of the invention. Briefly, unit 112 processes signal Sn' to determine whether the material originated from film or from a video camera. Since the value of Sn' changes only once per field, the calculation which follow could be performed by a micro-computer rather than the dedicated "hardware" implementation shown for unit 112.

For film data reduction, the magnitude of signal Sn' is first compared to a threshold TH1 to determine if a significant change occurred. If the threshold is not exceeded (possibly indicating a lack of motion), Sn' is not used further. Otherwise, a positive polarity for Sn' indicates that the difference between fields N−1 and N is significantly greater than the difference between fields N and N+1, suggesting that fields N and N+1 may have come from the same film frame while field N−1 did not. Conversely, a negative polarity for Sn' suggests that fields N−1 and N may be from the same film frame while field N+1 is from a different frame. The resulting sequence of positive and negative signs is analyzed by the five correlators (401–405) to determine if a known type of film sequence is present.

As in the "three-pixel" example previously discussed, with material from 2-2 pull-down sources, there are two possible phases: the transitions between film frame can occur at the beginning of even video fields or odd video fields. To detect 2-2 pull-down sources, two of the five correlators are used, one for each phase. Each correlator contains a binary comparison circuit (e.g., exclusive OR gate 510 as previously discussed) and a correlation counter (e.g., 504). The variable modulo counter (424) is set to modulo 2 and continuously counts fields providing reference signals to one correlator in the form of alternating sign and the opposite polarity to the other. Each correlator compares the sign of its reference to the sign of Sn'. When the signs match, the correlation counter is incremented. If the signs oppose, the correlation count is reset to zero. If the count reaches a predetermined limit (e.g., 63, as shown) the counter is inhibited from incrementing further and a signal is generated indicating that a film sequence has been detected by that correlator.

The detection of 3-2 pull-down sequences is accomplished in a similar manner except that all five of the correlators are used corresponding to the five possible phases of 3-2 material. Here, the modulo of counter 424 is changed to "5" to provide five references sequences to the correlators, each with a different phase offset. These phases are compared with the stored ROM phases as previously explained for identifying the 3-2 material. As in the previous examples, when exactly one of the correlators indicates that film is detected, the source is assumed to be of the type and phasing corresponding to the reference for that correlator. If a correlation count of L exists in more than one correlator simultaneously, all correlation counts are immediately reset to zero.

Since the system requires a number of fields containing significant motion, every one of which must exhibit the expected polarity, a high degree of immunity to falsely detecting film sources is achieved. However, the system may occasionally be slow in detecting the transition from film to video material. In particular, if the system is processing film and the source changes to video material having a very uniform motion, there can be significant differences between every field, but the differences may be nearly the same. In this case D1 and D4 will be nearly equal, so that D averages near zero and the magnitude of Sn' might not exceed the threshold TH-1.

A solution to the above problem, which can occur in the four-pixel system, is to separately accumulate positive and negative values of D, since even uniform motion will cause field differences to occur at different pixels on successive fields. Accordingly, let:

Sn+=Σ MAX (0, +D);
Sn−=Σ MAX (0, −D); and
Sn'=Σ[Sn+]−[Sn−]

The implementation of circuitry for Sn' as defined above requires only a pair of maximum value detectors and one subtractor for taking the difference between their outputs. This produces the same value for Sn', which is used as previously described. Additionally, since Sn+ and Sn− are separately available, each may be compared to a second, higher threshold TH2. If Sn+ exceeds TH-2 while the reference is "−", or if Sn− exceeds TH-2 when the reference is "+", the correlation count of the corresponding 2-2 pull-down correlator is reset; if either Sn+ or Sn− exceeds TH-2, the correlation count of the 3-2 pull-down correlator is reset; if either Sn+ or Sn− exceeds TH-2, the correlation count of the 3-2 pull-down correlator receiving a reference of "0" is reset. This ensures that the cessation of film material in the "four pixel" embodiment of the invention will be quickly detected under all conditions where significant motion is present. This correction is not necessary in the "three pixel" examples of the invention which relies upon accumulation of a two field difference rather than a three field difference. (i.e., in the example of FIG. 4, Sn is subtracted from the value of Sn a field earlier stored in register 402 to produce the field difference signal D2FLD and its sign bit). Accordingly, when implementing the "four pixel" embodiment of the invention, one may eliminate the field delay register 402 and the subtractor 404 and apply the signal Sn' (the accumulated difference signal D) to absolute value circuit 406 and its sign bit to bus 409. This simplification to the data reduction logic is possible because signal Sn' already represents a field to field difference (i.e., D=D1−D4) and so there is no need in the data reduction unit to provide further field storage and subtraction.

What is claimed is:

1. A method of film mode detection of an interlaced video signal, comprising:

concurrently providing selected pixels comprising a first pixel from a given field and second and third vertically aligned pixels of the same horizontal position from a temporally adjacent field;

comparing values of said selected pixels to produce for each first pixel, a pixel difference signal having a value of zero if the value of said first pixel is intermediate the values of said second and third pixels, said pixel difference signal otherwise having a value equal to an absolute value of a pixel difference between the value of said first pixel and the value of one of said second and third pixels having a value closest to the value of said first pixel;

accumulating non-zero values of said pixel difference signals over a predetermined portion of one field period of said interlaced video signal to provide a field difference signal;

analyzing said accumulated field difference signals for a pattern indicative of a film source of said video signal; and wherein said pattern in said analyzing step comprises two selectable patterns including a 2-2 pull down pattern and a 3-2 pull down pattern.

2. A method as recited in claim 1 wherein said analyzing step further includes producing a second output signal from said pattern identifying which of the given and adjacent fields was originated from a film source.

3. A method of film mode detection of an interlaced video signal, comprising:

concurrently providing selected pixels comprising a first pixel from a given field and second and third vertically aligned pixels of the same horizontal position from a temporally adjacent field;

comparing values of said selected pixels to produce for each first pixel, a pixel difference signal having a value of zero if the value of said first pixel is intermediate the values of said second and third pixels, said pixel difference signal otherwise having a value equal to an absolute value of a pixel difference between the value of said first pixel and the value of one of said second and third pixels having a value closest to the value of said first pixel;

accumulating non-zero values of said pixel difference signals over a predetermined portion of one field period of said interlaced video signal to provide a field difference signal;

analyzing said accumulated field difference signals for a pattern indicative of a film source of said video signal; and wherein generation of said pixel difference signal in said comparing step includes:

median filtering said first, second and third pixels to form a median filtered signal;

subtractively combining said median filtered signal and said first pixel to form a combined signal; and forming an absolute value of said combined signal to produce said pixel difference signal.

4. A method as recited in claim 3, wherein the step of generation of said pixel difference signal includes:

forming a first output signal representative of an absolute value of a difference between said first pixel and an average of said second and third pixels forming a second output signal representative of one-half of the absolute value of a difference of said second and third pixels;

subtractively combining the first and second output signals to form a combined signal; and limiting said combined signal to form said pixel difference signal.

5. Apparatus for providing film mode detection of an interlaced video signal, comprising:

a pixel selection circuit responsive to said video signal for concurrently providing a first pixel from a given field and second and third vertically aligned pixels of the same horizontal position from a temporally adjacent field;

a pixel comparison circuit for comparing values of said selected pixels to produce for each first pixel, a pixel difference signal having a value of zero if the value of said first pixel is intermediate the values of said second and third pixels, said pixel difference signal otherwise having a value equal to an absolute value of a pixel difference between the value of said first pixel and the value of one of said second and third pixels having a value closest to the value of said first pixel;

an accumulation circuit for accumulating non-zero values of said pixel difference signals over a predetermined portion of one field period of said interlaced video signal to provide a field difference signal; and an analyzer circuit for analyzing said accumulated field difference signals for a pattern indicative of a film source of said video signal; and wherein said pattern comprises two selectable patterns including a 2-2 pull down pattern and a 3-2 pull down pattern.

6. Apparatus as recited in claim 5 wherein said analyzer circuit further includes a second output for providing a second output signal identifying which of the given and adjacent fields was originated from a film source.

7. Apparatus for providing film mode detection of an interlaced video signal, comprising:

a pixel selection circuit responsive to said video signal for concurrently providing a first pixel from a given field and second and third vertically aligned pixels of the same horizontal position from a temporally adjacent field;

a pixel comparison circuit for comparing values of said selected pixels to produce for each first pixel, a pixel difference signal having a value of zero if the value of said first pixel is intermediate the values of said second and third pixels, said pixel difference signal otherwise having a value equal to an absolute value of a pixel difference between the value of said first pixel and the value of one of said second and third pixels having a value closest to the value of said first pixel;

an accumulation circuit for accumulating non-zero values of said pixel difference signals over a predetermined portion of one field period of said interlaced video signal to provide a field difference signal; and an analyzer circuit for analyzing said accumulated field difference signals for a pattern indicative of a film source of said video signal; and wherein said pixel comparison circuit comprises;
means for median filtering said first, second and third pixels to form a median filtered signal;
means for subtractively combining said median filtered signal and said first pixel to form a combined signal and
means for forming an absolute value of said combined signal to produce said pixel difference signal.

8. Apparatus as recited in claim 7 wherein generation of said pixel difference signal in said pixel comparison circuit includes first circuit means for forming a first signal representative of an absolute value of a difference between said first pixel and an average of said second and third pixels second circuit means for forming a second signal representative of one-half of the absolute value of a difference of said second and third pixels;

third circuit means for subtractively combining the first and second signals to form a combined signal; and fourth circuit means for limiting said combined signal to form said pixel difference signal.

* * * * *